(12) United States Patent
Faith et al.

(10) Patent No.: US 8,484,433 B2
(45) Date of Patent: Jul. 9, 2013

(54) DYNAMIC DETECTION AND REDUCTION OF UNALIGNED I/O OPERATIONS

(75) Inventors: Rickard E. Faith, Hillsborough, NC (US); Matthew D. Hambrick, Raleigh, NC (US); Matti A. Vanninen, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 223 days.

(21) Appl. No.: 12/950,392

(22) Filed: Nov. 19, 2010

(65) Prior Publication Data

US 2012/0131286 A1 May 24, 2012

(51) Int. Cl.
*G06F 12/06* (2006.01)
(52) U.S. Cl.
USPC .......................................... 711/201; 711/112
(58) Field of Classification Search
None
See application file for complete search history.

(56) References Cited

U.S. PATENT DOCUMENTS

| 7,886,135 | B1 * | 2/2011 | Coon et al. .................... | 712/244 |
| 2004/0098556 | A1 * | 5/2004 | Buxton et al. ................ | 711/201 |
| 2006/0036817 | A1 * | 2/2006 | Oza et al. ...................... | 711/155 |
| 2007/0079105 | A1 * | 4/2007 | Thompson ..................... | 711/201 |
| 2008/0028162 | A1 | 1/2008 | Thompson | |
| 2009/0217021 | A1 | 8/2009 | Goodson et al. | |

OTHER PUBLICATIONS

PCT Search Report and Written Opinion for PCT/US2011/061543, mailed Feb. 15, 2012, 15 pages.
International Search Report/Written Opinion, PCT/US2011/061543, Feb. 15, 2012, 15 pages.

* cited by examiner

*Primary Examiner* — Than Nguyen
(74) *Attorney, Agent, or Firm* — Blakely, Sokoloff, Taylor & Zafman LLP

(57) ABSTRACT

Detection and reduction of unaligned input/output ("I/O") requests is implemented by a storage server determining an alignment value for data stored by the server within a storage system on behalf of a first client, writing the alignment value to a portion of the volume that stores the data for the first client, but not to a portion of the volume that stores data for a second client, and changing a location of data within the portion of the volume that stores the data for the first client, but not a location of data in the portion of the volume that stores data for the second client, to an alignment corresponding to the alignment value. The alignment value is applied to I/O requests directed to the portion of the volume that stores the data blocks for the first client after the location of the data blocks has been changed.

20 Claims, 9 Drawing Sheets

| Storage system blocks | 0 | 4096 | 8192 | 12288 | 16384 | 20480 | 24576 |

| Client-side blocks | 0 | 4096 | 8192 | 12288 | 16384 | 20480 | 24576 |

Fig. 4

| Storage system blocks | 0 | 4096 | 8192 | 12288 | 16384 | 20480 | 24576 |

| Client-side blocks | 0 | 4096 | 8192 | 12288 | 16384 | 20480 | 24576 |

DYNAMIC DETECTION AND REDUCTION OF UNALIGNED I/O OPERATIONS

FIELD OF THE INVENTION

At least one embodiment of the present invention pertains to data storage systems, and more particularly, to dynamically detecting and reducing unaligned write requests in a storage container that may have differing misalignments for different portions by computing, updating, and applying an alignment value to a portion of indirect block access requests.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2010, NetApp, Inc., All Rights Reserved.

BACKGROUND

Various forms of network-based storage systems exist today. These forms include network attached storage (NAS), storage area networks (SAN's), and others. Network-based storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems (clients). The files may be stored in a storage system that includes one or more arrays of mass storage devices, such as magnetic or optical disks or tapes, by using a data storage scheme such as Redundant Array of Inexpensive Disks (RAID). In a SAN context, a storage server provides clients with block-level access to stored data, rather than file-level access. Some storage servers are capable of providing clients with both file-level access and block-level access, such as certain storage servers made by NetApp, Inc. (NetApp®) of Sunnyvale, Calif.

Client devices may implement a hypervisor software layer. A hypervisor software layer, also referred to as a virtual machine monitor, allows the client processing system to run multiple virtual machines. A virtual machine is a software implementation of a machine (i.e. a computer) that executes instructions like a physical machine (e.g., different operating systems, different instances of the same operating system, or other software implementations that appear as "different machines" within a single computer). Additionally, data managed by a storage server on behalf of multiple client devices, multiple client virtual machines within one or more client machines, or multiple portions of a single client virtual machine may be stored within a single storage container or volume (e.g., a LUN (Logical Unit Number), large NFS (Network File System) file, or another equivalent logical division of storage).

A storage system often uses a fixed block size for all internal operations. For example, WAFL (Write Anywhere File Layout) uses 4 KB (4096 bytes) blocks for all operations, as do client-side file systems, such as NTFS (New Technology File System) and ext4fs (fourth extended filesystem). Since file systems usually start individual files on block boundaries, application writers take advantage of a file system's block size and alignment to increase the performance of their input/output ("I/O") operations—for example, always performing I/O operations that are a multiple of 4 KB, and always aligning these operations to the beginning of a file. Other file systems or applications, however, may use block boundaries of a different size (e.g., 512 bytes).

When the block boundaries of a client-side file system and a server-side file system do not match, I/O operations may result in a "partial write," e.g., writing to only a portion of a storage system block. Partial writes can result from the starting block of a client-side file becoming unaligned from the server-side container blocks. Accordingly, data stored on behalf of a client that could fit within a single server-side container file block may end up overlapping more than one server-side container file block. When the overlapping data is accessed via an I/O operation, it requires reading two server-side container file blocks rather than just one. A write request to the unaligned client-side file system block that spans two server-side container file blocks (e.g., overwriting the overlapping data) includes preserving the contents of the server-side container file blocks that are not being overwritten. As a result, the two server-side container file blocks are read (e.g., into one or more buffers), the client-side block is written into corresponding portions of the buffered server-side container file blocks, preserving the contents that is not being overwritten, and the updated server-side container file blocks are written back to the storage system. In contrast, the identical client-side write operation would include a single write operation for blocks that are aligned.

One solution to the problem of unaligned I/O operations is to obtain cooperation from the client-side file system to ensure that there is alignment in all cases. There are two problems, however, with the cooperative approach: 1) cooperation is usually performed within the context of the granularity of a single storage-system volume, which is not helpful if more than one virtual machine file system is stored within a single volume because each virtual machine may have a different misalignment; and 2) if misalignment is discovered after the volume has been filled with data, all of the data has to be moved from a misaligned position into an aligned position, which can be a very computationally expensive operation (e.g., in terms of I/O operations) for both the storage server and the client.

SUMMARY

Detection and reduction of unaligned input/output ("I/O") requests is implemented by a storage server determining an alignment value for data stored by the server within a storage system on behalf of a first client, writing the alignment value to a portion of the volume that stores the data for the first client, but not to a portion of the volume that stores data for a second client, and changing a location of data within the portion of the volume that stores the data for the first client, but not a location of data in the portion of the volume that stores data for the second client, to an alignment corresponding to the alignment value. The alignment value is applied to I/O requests directed to the portion of the volume that stores the data blocks for the first client after the location of the data blocks has been changed.

BRIEF DESCRIPTION OF THE DRAWINGS

One or more embodiments of the present invention are illustrated by way of example and not limitation in the figures of the accompanying drawings, in which like references indicate similar elements and in which:

FIG. 4 shows an exemplary client-side file that is aligned with a corresponding portion of a volume within a storage server;

FIG. 5 shows an exemplary client-side file that is not aligned with a corresponding portion of a volume within a storage server;

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

As set forth in further detail below, embodiments of dynamic detection and reduction of unaligned I/O operations include determining an alignment value for data stored by the server within a storage system on behalf of a first client, writing the alignment value to a portion of the volume that stores the data for the first client, but not to a portion of the volume that stores data for a second client, and changing a location of data within the portion of the volume that stores the data for the first client, but not a location of data in the portion of the volume that stores data for the second client, to an alignment corresponding to the alignment value. For one embodiment, the alignment value is applied to I/O requests directed to the portion of the volume that stores the data blocks for the first client after the location of the data blocks has been changed.

Instead of moving all of the data blocks for an entire volume and cooperating with a client device to align the client-side blocks with the moved storage system blocks, for one embodiment, a portion of data blocks within the volume can be moved and an alignment value can be applied to 110 requests directed to that portion. Applying an alignment value to I/O requests for only a portion of a volume (e.g., an indirect block) allows for adjustments to be made for differing misalignments for multiple virtual machines within a single volume. Additionally, misalignments discovered or introduced after an initial storage-system set up can be handled on an as-needed basis with a lower computation cost because the application of an alignment value removes the need for client cooperation and only a portion of the volume is realigned.

Figure 1:
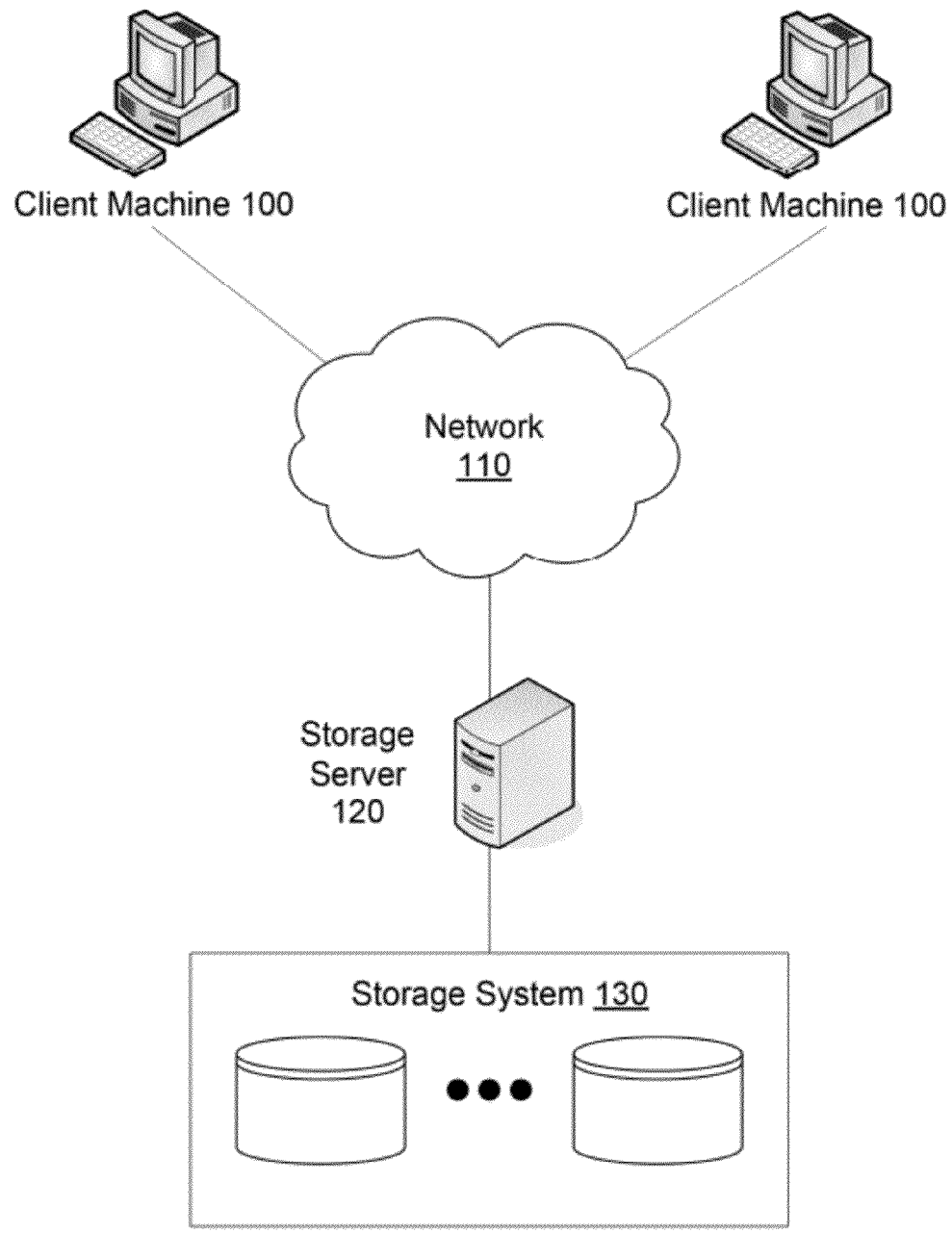
FIG. 1 illustrates a storage network environment, in which dynamic detection and reduction of unaligned I/O operations may be implemented.

FIG. 1 shows an exemplary network environment that incorporates one or more client devices 100 (clients) coupled to a network 110. Each of the clients 100 may be, for example, a conventional personal computer (PC), server-class computer, workstation, one or more virtual machines, or the like. The clients 100 are coupled to the storage server 120 through a network 110. The network 110 may be, for example, a local area network (LAN), a wide area network (WAN), a global area network (GAN), etc., such as the Internet, a Fibre Channel fabric, or a combination of such networks.

A client 100 may also refer one or more virtual machines. A hypervisor, also referred to as a virtual machine monitor, is a software layer that allows a processing system to run multiple virtual machines (e.g., different operating systems, different instances of the same operating system, or other software implementations that appear as "different machines" within a single computer). The hypervisor software layer resides between the virtual machines and the hardware and/or primary operating system of a machine and allows for the sharing of the underlying physical machine resources between different virtual machines. Accordingly, references to multiple clients 100 may refer to multiple virtual machines within the same client device, a virtual machine in one client and a separate client device 100, virtual machines from multiple client devices 100, or a combination thereof.

The storage server 120, in which an embodiment of dynamic detection and reduction of unaligned I/O operations can be implemented, is described in further detail below with reference to FIG. 2.

For one embodiment, storage server 120 is referred to as a network storage subsystem. A network storage subsystem provides networked storage services for a specific application or purpose. Examples of such applications include database applications, web applications, Enterprise Resource Planning (ERP) applications, etc., e.g., implemented in a client 100. Examples of such purposes include file archiving, backup, mirroring, etc., provided, for example, on archive, backup, or secondary storage server 120 connected to a primary storage server 120. A network storage subsystem can also be implemented with a collection of networked resources provided across multiple storage servers 120 and/or storage units.

For example, a first storage server 120 functions as a primary provider of data storage services to client devices 100. Data storage requests from clients 100 are serviced storage system 130 organized as one or more storage objects. A secondary storage server 120 takes a standby role in a protection relationship with the primary storage server, replicating storage objects from the primary storage server 120 to storage objects organized on disks of the secondary storage server. In operation, the secondary storage server 120 does not service requests from clients 100 until data in the primary storage object becomes inaccessible such as in a disaster with the primary storage server 120, such event considered a failure at the primary storage server 120. Upon a failure at the primary storage server 120, requests from clients 100 intended for the primary storage object are serviced using replicated data (i.e. the secondary storage object) at the secondary storage server 120.

It will be appreciated that in other embodiments, the network storage system may include more than two storage servers 120. In these cases, protection relationships may be operative between various storage servers 120 such that one or more primary storage objects from one storage server 120 may be replicated to another storage server 120 other than the secondary storage server 120 described above. Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 120 should be taken as illustrative only.

The storage server 120 is further coupled to a storage system 130. The storage system 130 includes a set of mass storage devices. The mass storage devices in the storage system 130 may be, for example, conventional magnetic disks, solid-state disks (SSD), magneto-optical (MO) storage, or any other type of non-volatile storage devices suitable for storing large quantities of data. The storage server 120 manages the storage system 130, for example, by receiving and responding to various I/O requests from the client(s) 100, directed to data stored in or to be stored in the storage system 130. Although illustrated as separate components, for one embodiment, the storage server 120 and storage system 130 may be a part of/housed within a single device.

As used herein, a data block refers to a fixed size block (e.g., 4 KB) that stores client-side data. An indirect block refers to a block that stores locations of data blocks. For example, indirect blocks in WAFL store locations for 255, 510, 512, OR 1024 data blocks. As a result, a data block stored by the storage server 120 on behalf of a client 100 is referenced via an address maintained on the client-side and mapped, directly or indirectly, to an address on the storage-side.

For one embodiment, storage system 130 is managed as a RAID array. RAID is a data storage scheme that divides and replicates data among multiple hard disk drives - e.g., in stripes of data. Data striping is the technique of segmenting logically sequential data, such as a single file, so that segments can be assigned to multiple physical devices/hard drives. Redundant (parity) data is stored to allow problems to be detected and possibly fixed. For example, if one were to configure a hardware-based RAID-5 volume using three 250 GB hard drives (two drives for data, and one for parity), the operating system would be presented with a single 500 GB volume and the exemplary single file may be stored across the two data drives.

It will be appreciated that certain embodiments of the present invention may include solid-state memories, e.g., flash storage devices constituting storage system 130. For example, storage system 130 may be operative with non-volatile, solid-state NAND flash devices which are block-oriented devices having good random read performance, i.e., random read operations to flash devices are substantially faster than random write operations to flash devices. Data stored on a flash device is accessed (e.g., via I/O requests) in units of blocks, which in the present embodiment are 4 KB in size, although other block sizes (e.g., 2 KB, 8 KB, etc.) may also be used. For one embodiment, 4 KB as used herein refers to 4,096 bytes. For an alternate embodiment, 4 KB refers to 4,000 bytes.

Figure 2:
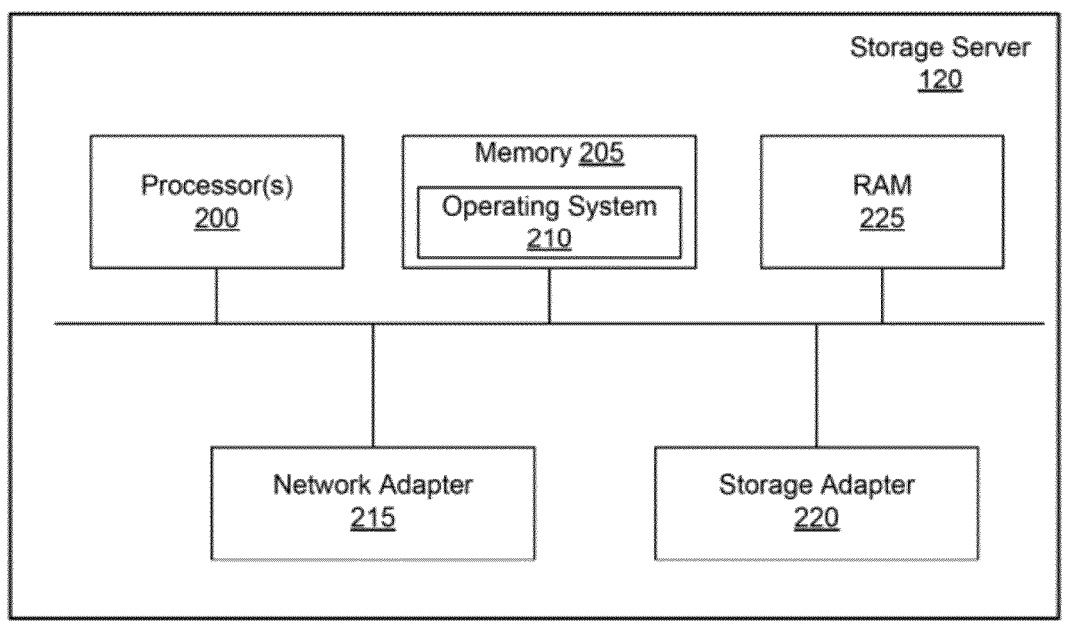
FIG. 2 shows an example of the hardware architecture of a storage server in which dynamic detection and reduction of unaligned I/O operations may be implemented.

FIG. 2 is a block diagram showing an example of the architecture of a storage server 120 at a high level. Certain standard and well-known components, which are not germane to the present invention, are not shown. Although illustrated as a self-contained element, the storage server 120 may have a distributed architecture (e.g., multiple storage servers 120 or separate modules cooperating or otherwise sharing the task of managing a storage system).

For one embodiment, the storage server 120 is operative as multiple functional components that cooperate to provide the network-based storage system. To that end, the storage server 120 is organized as one or more processors 200, a memory 205, a network adapter 215, a storage adapter 220, and a random access memory (RAM) 225 coupled to a bus system. The bus system shown in FIG. 2 is an abstraction that represents any one or more separate physical buses and/or point-to-point connections, connected by appropriate bridges, adapters and/or controllers.

The processor(s) 200 are the central processing units (CPUs) of the storage server 120 and, thus, control its overall operation. The processor(s) 200 accomplish this by executing software stored in memory 205. For one embodiment, individual adapters (e.g., network adapter 215 and storage adapter 220) each include a processor and memory for carrying out respective module operations.

The memory 205 includes the main memory of the storage server 120. The memory 205 stores, among other things, the storage server's operating system 210, which, according to one embodiment, includes instructions executed by processor(s) 200 to implement an embodiment of detection and reduction of unaligned I/O operations as described herein.

The network adapter 215 includes functionality that enables the storage server 120 to connect to clients 100 via network 110 and may include protocol components such as a Media Access Control (MAC) layer, Common Internet File System (CIFS), Network File System (NFS), Internet Protocol (IP) layer, Transport Control Protocol (TCP) layer, User Datagram Protocol (UDP) layer, and other protocols known in the art for facilitating such connectivity. In contrast, the storage adapter 220 may connect to one or more storage devices within storage system 130, e.g., via cluster switching fabric, and may be operative to service client I/O requests within the storage system 130. For one embodiment, the storage adapter 220 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. Illustratively, a storage abstraction layer (e.g., file system) of the storage adapter 220 divides the physical storage of storage system 130 into storage objects (e.g., pages, files, etc.). Requests received by the storage server 120 (e.g., via network adapter 215) may thus include storage object identifiers, e.g., a byte offset or logical block address (LBA), to indicate a storage object on which to carry out the request. For one embodiment, the storage adapter 220 performs dynamic detection and reduction of unaligned I/O operations as described further below. Alternatively, dynamic detection and reduction of unaligned I/O operations is performed by the network adapter 215, processor(s) 200, or combination of one or more of the processor(s) 200, network adapter 215, and storage adapter 220.

The storage server 120 also includes a RAM 225. For one embodiment, a cache is implemented within the RAM 225. Alternatively, the cache may be implemented one or more other volatile and/or non-volatile memories.

It will be readily apparent that input/output devices, such as a keyboard, a pointing device, and a display, may be coupled to the storage server 120. These features have not been illustrated for the sake of clarity.

Figure 3:
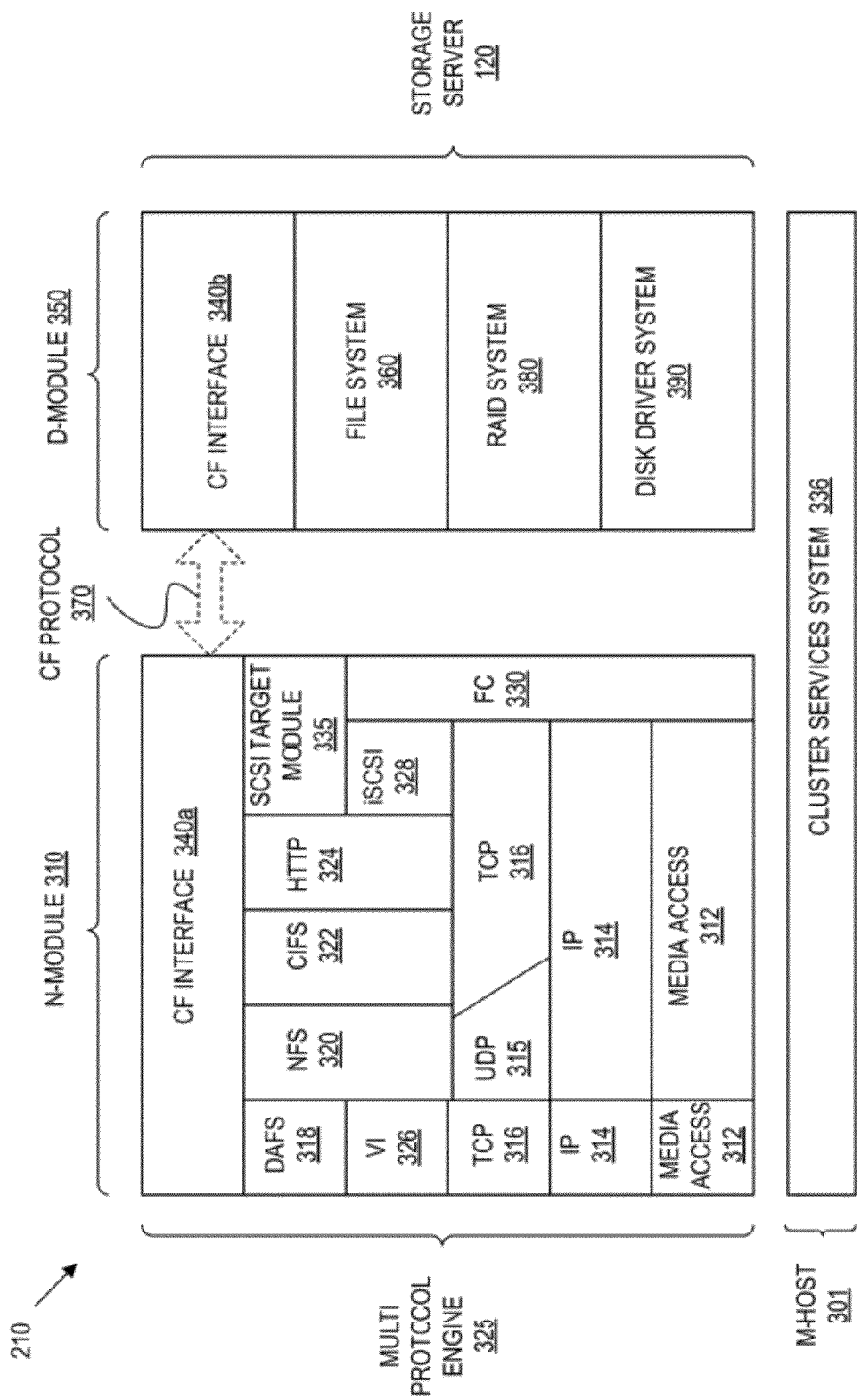
FIG. 3 shows an exemplary block diagram of a storage server operating system.

FIG. 3 is a block diagram of a storage operating system, such as storage operating system 210 of FIG. 2. The storage operating system comprises a series of software layers executed by a processor (e.g., processor 200) and organized to form an integrated network protocol stack or, more generally, a multi-protocol engine 325 that provides data paths for clients 100 to access information stored on the storage server 120 using block and file access protocols.

Multi-protocol engine 325 includes a media access layer 312 of network drivers (e.g., gigabit Ethernet drivers) that interface with network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318. An Internet Small Computer System Interface (iSCSI) driver layer 328 provides block protocol access over the TCP/IP network protocol layers, while a Fibre Channel (FC) driver layer 330 receives and transmits block access requests and responses to and from the storage server. In certain cases, a Fibre Channel over Ethernet (FCoE) layer (not shown) may also be operative in multi-protocol engine 325 to receive and transmit requests and responses to and from the storage server 120. The FC and iSCSI drivers provide respective FC- and iSCSI-specific access control to the blocks and, thus, manage exports of Logical Unit Numbers (LUN's) to either iSCSI or FC protocol or, alternatively, to both iSCSI and FC protocol when accessing blocks on the storage server 120.

The storage operating system 210 also includes a series of software layers organized to form a storage server 120 that provides data paths for accessing information stored on storage devices implementing secure storage (e.g., storage system 130). Information may include data received from a client 100, in addition to data accessed by the storage operating system 210 in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement may involve logical volume block number (vbn) spaces, wherein each volume is associated with a unique vbn.

File system 360 implements a virtualization system of the storage operating system through the interaction with one or more virtualization modules illustratively embodied as, e.g., a SCSI target module 335. SCSI target module 335 is generally disposed between drivers 328, 330 and file system 360 to provide a translation layer between the block (LUN) space and the file system space, where LUN's are represented as blocks. File system 360 illustratively implements the WAFL file system having an on-disk format representation that is block-based using, e.g., 4 KB blocks and using a data structure such as index nodes (inodes) to identify files and file attributes (such as creation time, access permissions, size and block location). File system 360 uses files to store metadata describing the layout of its file system, including an inode file, which directly or indirectly references (points to) the underlying data blocks of a file. For one embodiment, the file system 360 performs dynamic detection and reduction of unaligned 110 operations as described further below. Alternatively, dynamic detection and reduction of unaligned writes is implemented its own layer, or performed by another layer, in cooperation with the file system 360.

Operationally, a request from a client 100 is forwarded as a packet over the network and onto the storage server 120 where it is received at a network adapter (e.g., network adapter 215). A network driver such as layer 312 or layer 330 processes the packet and, if appropriate, passes it on to a network protocol and file access layer for additional processing prior to forwarding to file system 360. There, file system 360 generates operations to load (retrieve) the requested data from the disks if it is not resident "in core", i.e., in memory 223. If the information is not in memory, file system 360 accesses the inode file to retrieve a logical vbn and passes a message structure including the logical vbn to the RAID system 380. There, the logical vbn is mapped to a disk identifier and device block number (e.g., disk,dbn) and sent to an appropriate driver (e.g., SCSI) of disk driver system 390. The disk driver accesses the dbn from the specified disk and loads the requested data block(s) in memory 205 for processing by the storage server 120. Upon completion of the request, the storage server 120 returns a reply to the client 100 over the network 110.

It should be noted that the software "path" through the storage operating system layers described above needed to perform data storage access for the client request received at the storage server 120 may alternatively be implemented in hardware. That is, in an alternate embodiment, a storage access request data path may be implemented as logic circuitry embodied within a field programmable gate array (FPGA) or an application specific integrated circuit (ASIC). This type of hardware implementation increases the performance of the storage service provided by the storage server 120 in response to a request issued by a client 100. It is expressly contemplated that the various processes, architectures and procedures described herein can be implemented in hardware, firmware or software.

When implemented in a cluster, data access components of the storage operating system may be embodied as D-module 350 for accessing data stored on disk. In contrast, multi-protocol engine 325 may be embodied as N-module 310 to perform protocol termination with respect to a client issuing incoming access over the network, as well as to redirect the access requests to any other N-module 310 in the cluster. A cluster services system 336 may further implement an M-host to provide cluster services for generating information sharing operations to present a distributed file system image for the cluster. For instance, media access layer 312 may send and receive information packets between the various cluster services systems of the nodes to synchronize the replicated databases in each of the nodes.

In addition, a cluster fabric (CF) interface module 340 (CF interface modules 340A, 340B) may facilitate intra-cluster communication between N-module 310 and D-module 350 using a CF protocol 370. For instance, D-module 350 may expose a CF application programming interface (API) to which N-module 310 (or another D-module not shown) issues calls. To that end, CF interface module 340 can be organized as a CF encoder/decoder using local procedure calls (LPCs) and remote procedure calls (RPCs) to communicate a file system command to between D-modules residing on the same node and remote nodes, respectively.

Illustratively, the storage operating system issues a read- or write-command to a storage device controller (e.g., device controller 228) through disk driver system 390 for accessing a physical storage object (e.g., disk) using the disk identifier mapped from the logical vbn by RAID system 380.

FIG. 4 illustrates an exemplary client-side file that is aligned with a corresponding portion of a volume within a storage server. In this example, the byte offsets that demarcate the start of each data block on the client-side file system map to the start of each storage system data block. When the client-side file is aligned with the storage system data blocks, a read or write request for a data block can be accomplished via a single I/O request. For example, a write operation initiated by the client for the client-side data block starting at byte 4096 results in the storage server overwriting the storage system data block starting at byte 4096 as requested by the client.

FIG. 5 illustrates an exemplary client-side file that is not aligned with a corresponding portion of a volume within a storage server. For one embodiment, the misalignment results from a master boot record, partition sector, or other record used to bootstrap a virtual machine, uniquely identify a portion of storage, or another known function. A master boot record, for example, is a 512 byte sector (or other size that is less than storage container block size). As a result, the client-side blocks that follow the master boot record, which would ordinarily map to the same-size storage system blocks, are unaligned.

When the client-side file is not aligned with the storage system blocks, a request to read or write a block will suffer a performance set back as compared to an aligned system. For example, when blocks are not aligned, the client-side block that starts at 4096 spans two blocks within the storage system volume: the storage system blocks that start at 4096 and 8192. Given that the unaligned client-side block only partially overlaps each of two storage system blocks, the storage server 120 cannot simply overwrite a single block of data. A write request directed to the client-side block that starts at 4096 results in reading two blocks and preserving the contents of the storage system blocks that are not being overwritten while writing the new data to the portions that are being overwritten. The write request for a single client-side block results in two reads and two writes, which is computationally more expensive than the single write that results in the corresponding aligned system.

Adjustments for misalignment have typically been performed within the context of the granularity of a single storage-system volume. Once a volume has been filled with data, moving all of the data from a misaligned position into an aligned position can be a very computationally expensive operation for the storage server 120 and the client 100. Additionally, an attempt to move an entire volume of data blocks by a single value (e.g., a number of bytes) is not helpful if more than one client 100 is stored within a single volume because each client 100 may have a different misalignment.

Instead of moving all of the data blocks for an entire volume and cooperating with the client 100 to align the client-side blocks with the moved storage system blocks, for one embodiment, a portion of data blocks within the volume can be moved and an alignment value can be applied to I/O requests directed to that portion. Applying an alignment value to I/O requests for only a portion of a volume (e.g., an indirect block) allows for adjustments to be made for differing misalignments for multiple virtual machines within a single volume. Additionally, misalignments discovered or introduced after an initial storage-system set up can be handled on an as-needed basis with a lower computation cost because the application of an alignment value removes the need for client cooperation and only a portion of the volume is realigned.

For one embodiment, alignments of data blocks are performed at a granularity of an indirect block and an alignment value is written to each indirect block. When the location of a data block is looked up in an indirect block, this alignment value will be applied to the data block address before lookup. For one embodiment, the alignment value is refers to a multiple of 512 bytes—e.g., an alignment value of zero would be the same as the normal case without the alignment value, an alignment value of one refers to 512 bytes, an alignment value of two refers to 1024 bytes, etc. Alternatively, the alignment value refers directly to a number of bytes or a different multiple of bytes.

Figure 6:
FIG. 6 shows an exemplary use of an alignment value for an indirect block that is not aligned with a corresponding portion of a volume within a storage server.
Figure 7:
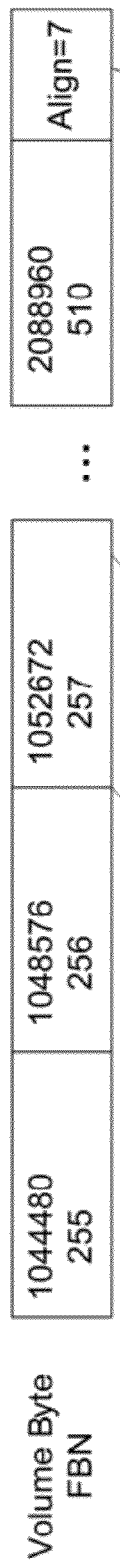
FIG. 7 shows an exemplary use of an alignment value for an indirect block that has been aligned with a corresponding portion of a volume within a storage server.

FIGS. 6 and 7 illustrate the use of an alignment value during a read operation. The use of an alignment value during a write operation, however, would be similar. While the examples set forth in the figures described herein refer to an indirect block of 255 data blocks, a different number of data blocks could be used.

FIG. 6 shows exemplary use of an alignment value of zero for an indirect block that is not aligned with a corresponding portion of a volume within a storage server. For example, the indirect block is a part of a file system that utilizes a block size of 4KB, but the first 512 bytes of the file system are used for a boot sector. As a result, the illustrated indirect block is misaligned by 512 bytes. An alignment value of zero will result in no adjustment for the misalignment. For one embodiment, the alignment value is stored in a few bits at the beginning, the end (as illustrated), or elsewhere within the indirect block. The illustrated indirect block starts at byte offset 1044480 in the volume and covers the next 255 data blocks (up to and including the block starting at offset 2088960). An exemplary I/O operation indirectly reads data from two storage system data blocks into a pair of 4KB buffers. The data for the first buffer starts at volume byte offset 1049088 and contains 3584 bytes. The data for the second buffer starts at byte offset 1052672 and contains 512 bytes. The value 1049088 is equal to 1044480 +4096+512, which maps to a portion of the file block number (FBN) 256 in the indirect block. The storage server 120 reads the FBN 256 and copies the last 3584 bytes into the first buffer. The value 1052672 is equal to 1044480 +4096+4096, which references a portion of the FBN 257 in the indirect block. The storage server 120 reads FBN 257 and copies the first 512 bytes into the second buffer. The storage server 120 placed 4096 bytes of user data into the buffers, but it read 8192 bytes from disk to do so.

FIG. 7 shows exemplary use of an alignment value of seven for the indirect block illustrated in FIG. 6 after it has been aligned according to the alignment value. The alignment of the data blocks includes reading the data blocks from storage and rewriting them shifted by the alignment value. For one embodiment, the client 100 is not aware that an alignment of the indirect block has been performed by the storage server 120. Without cooperating in the alignment, or otherwise knowing that the alignment was performed, the client 100 continues to reference data blocks by the same block numbers that it used prior to the alignment being performed by the storage server 120 (e.g., the block numbers/byte offsets described above with reference to FIG. 6). An alignment value is applied by the storage server 120 to the block numbers transmitted by the client 100 to compensate for the alignment. The exemplary alignment value of seven illustrated in FIG. 6 indicates an alignment of 7*512 bytes, or 3584 bytes.

Similar to FIG. 6, the I/O operation in FIG. 7 references a pair of 4KB buffers. The first buffer starts at volume byte offset 1049088 and contains 3584 bytes. The second buffer starts at volume byte offset 1052672 and contains 512 bytes. The alignment of the data blocks in the indirect block and adjustment of the alignment value from zero to seven is performed without requiring cooperation from the client 100. Accordingly, instead of using the volume byte offset 1049088 as done above, the storage server 120 adds the alignment value to the offset: 1049088 +3584=1052672. For one embodiment, the alignment value is added to the access byte offset provided by the client. Alternatively, the alignment value is subtracted from the client access byte. For yet another alternative embodiment, another or an additional mathematical operation is performed to the alignment value or client access byte to determine the volume byte offset.

In the example illustrated in FIG. 7, the storage server 120 performs the read starting at byte offset 1052672. Byte offset 1052672 is 1044480+4096+4096, so the read references FBN 257. The storage server 120 copies the first 3584 bytes of this data block into the first buffer and the last 512 bytes into the second buffer. As a result of aligning the data blocks for the indirect block, and accessing them by way of the alignment value, the storage server 120 placed 4096 bytes of user data into the buffers, but only read 4096 bytes from disk.

The alignment value is used when mapping a FBN in an indirect block to a physical or disk data block number and does not have to be known to other parts of the file system. In particular, indirect block lookups are done the same way with or without a non-zero alignment value. For example, the alignment value can be applied after the data block is determined from the indirect block. As a result, embodiments are easily retro-fit onto existing file systems.

Figure 8:
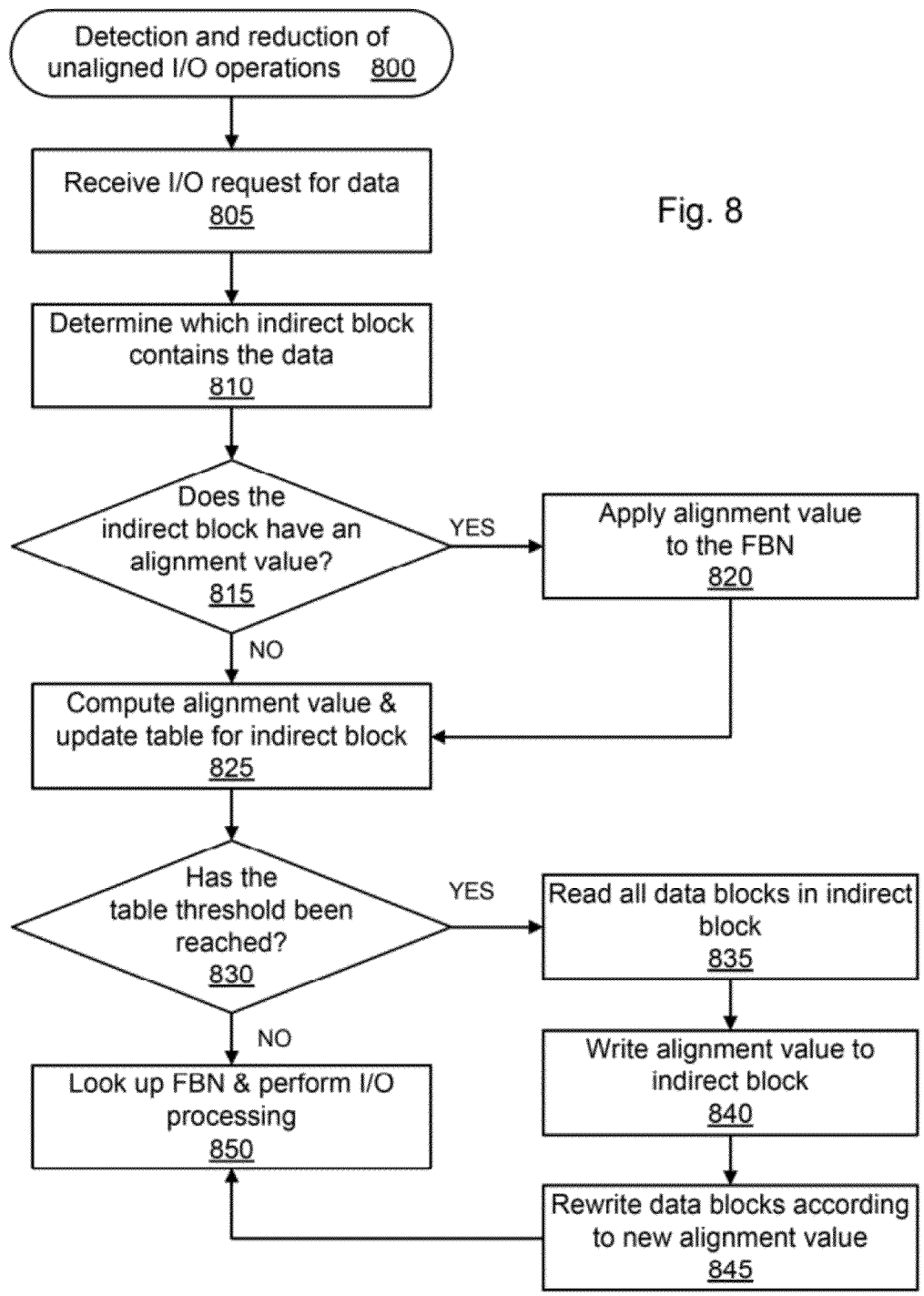
FIG. 8 shows an exemplary flow chart for detection and reduction of unaligned I/O operations.

FIG. 8 shows an exemplary flow chart for a method 800 of detection and reduction of unaligned I/O operations. An I/O request is received by the storage server 120 for a data block (e.g., referenced by an FBN, offset value, address, etc.) at block 805. The storage server 120 determines which indirect block contains the data block at block 810. The storage server 120 determines whether or not the indirect block currently has an alignment value at block 815. If the indirect block has an alignment value, the alignment value is applied to the FBN at block 820. If the indirect bock does not have an alignment value (e.g., an alignment value of zero), or after an alignment value has been applied to the FBN, the storage server 120 computes and updates a histogram for tracking alignment of data blocks within the indirect block at block 825.

The alignment value for each indirect block is not known when the file system is created and, even when it is known, the alignment value can change over time (e.g., if a client-side file system is deleted and recreated with a different misalignment). To determine a new or updated alignment value, this storage server 120 tracks I/O operations associated with each indirect block. For every I/O operation, a count for an alignment value is incremented in a histogram, table, or other data structure based on a byte distance between an offset value from the client 100 and the offset for the start of a data block (the same data block or the next data block, depending on the direction of the shift).

Figure 9:
FIG. 9 shows an exemplary table for tacking alignment values for a portion of a volume.

FIG. 9 shows an exemplary table for tracking tacking alignment values for a portion of a volume (e.g., an indirect block). The number of potential alignment values depends on the size of data blocks and the granularity of offsets used. For example, WAFL uses 4096 byte blocks and modern disk drives have 512 byte sectors. An alignment value for such an exemplary system uses a 512 byte sector offset and, accordingly, eight possible alignment values in the 4096 byte data block which have been illustrated as alignment values 0-7. For one embodiment, the table includes an additional entry for accesses that will not be helped by a change in the alignment value. The exemplary file system with 4096 byte blocks that uses disks with 512 byte sectors would include nine table entries to account for the additional entry. For an alternative embodiment, the table includes eight entries and the existing alignment value is incremented for accesses that will not be helped by a change in the alignment value. For one embodiment, each indirect block includes storage space for bits representing a current alignment value and for the table.

For each 4096 byte access to the indirect block, the storage server 120 increments the alignment value of one of the table entries. For example, if the 4096 byte access is aligned on a 4096 byte boundary, we increment a table entry that corresponds to an alignment value of zero. If the access is offset by 512 bytes from the data block boundary the storage server 120 increments a table entry that corresponds to an alignment value of one. For all I/O requests that are not the same length as the data block (e.g., 1 KB accesses in the middle of a 4 KB data block), the storage server 120 increments a table entry to indicate that the indirect block will not benefit from a change in the alignment value.

The storage server 120 determines whether a threshold has been reached for the table at block 830. For example, after some number of I/O requests, the storage server 120 examines the table entries to determine a new value for the alignment. Alternatively, the storage server 120 examines the table entries when a particular entry reaches a maximum value, after an expiration of period of time, or a combination thereof. For example, the indirect block illustrated in FIG. 6 initially uses the alignment value of 0 and, subsequently in FIG. 7, uses the alignment value of 7. As an example, the table illustrated in FIG. 9 illustrates the tracking of I/O requests directed to the indirect block while the alignment value was set at 0. Once a threshold has been reached, e.g., an alignment value has reached a threshold of 16, the storage server 120 uses the alignment value (in this example, the alignment value of 7) with the highest value as the new alignment value.

For one embodiment, the storage server 120 uses the table entry with the highest value as the new alignment value. For one embodiment, if the entry indicates that the indirect block will not benefit from a change in the alignment value, the storage server 120 does not change the alignment value. For example, if more than one entry share or are above a particular value, or if there is not threshold difference between the two highest values, the storage server 120 does not change the alignment value.

If the table threshold has been reached, the storage server 120 changes the alignment of the indirect block by reading all of the storage system data blocks in the indirect block at block 835, changing the alignment value of the indirect block at block 840, and writing all of the data blocks back to disk using the new alignment at block 845. In this way, as the optimal alignment value changes over time, the storage server 120 updates the alignment value in each indirect block individually as needed.

If the table threshold has not been reached, or after the storage server 120 has changed the alignment of the indirect block, the storage server 120 looks up the FBN (with the alignment value applied) and performs the I/O request at block 850.

When a file system is new, it is not desirable to start with an alignment value of zero and then have to change the alignment value later for each indirect block. Neighboring indirect blocks are often a part of the same virtual machine and, therefore, it would be beneficial for a new indirect block to start with the alignment value of a neighboring indirect block. For one embodiment, the storage server 120 can often avoid this subsequent change of the alignment value of a new indirect block from zero to another value by initially using the alignment value of a nearby indirect block whenever beginning to use a new indirect block.

For one embodiment, when consecutive indirect blocks are of the same alignment, an extra pointer in one indirect block can point to the same disk block as the first or last (depending on direction the blocks are shifted) pointer in the neighboring indirect block. This avoids partial I/O operations when dealing with consecutive indirect blocks that have the same alignment values.

For one embodiment, the first and last data block in the indirect block are handled differently from the remainder of data blocks because, with an alignment value applied, the first and last data blocks may be referenced by the previous or subsequent indirect block. For one embodiment, an indirect block has references to all of the data blocks it is expected to reference, which includes modifying the legacy indirect block. First, an additional pointer is added to the indirect block to reference data that comes before a newly-aligned first data block. Second, when the last data block in an indirect block is referenced, the data in that block may be referenced by the next indirect block. Depending on the file system, this may mean that reading or writing the last block in an indirect block may require reading or writing two indirect blocks and two data blocks, similar to the partial write case outlined above. This case, however, happens on indirect block boundaries, which only occurs a small percentage of the time because indirect blocks reference hundreds of data blocks. This border block scenario is described further with respect to FIGS. 10 and 11.

Figure 10:
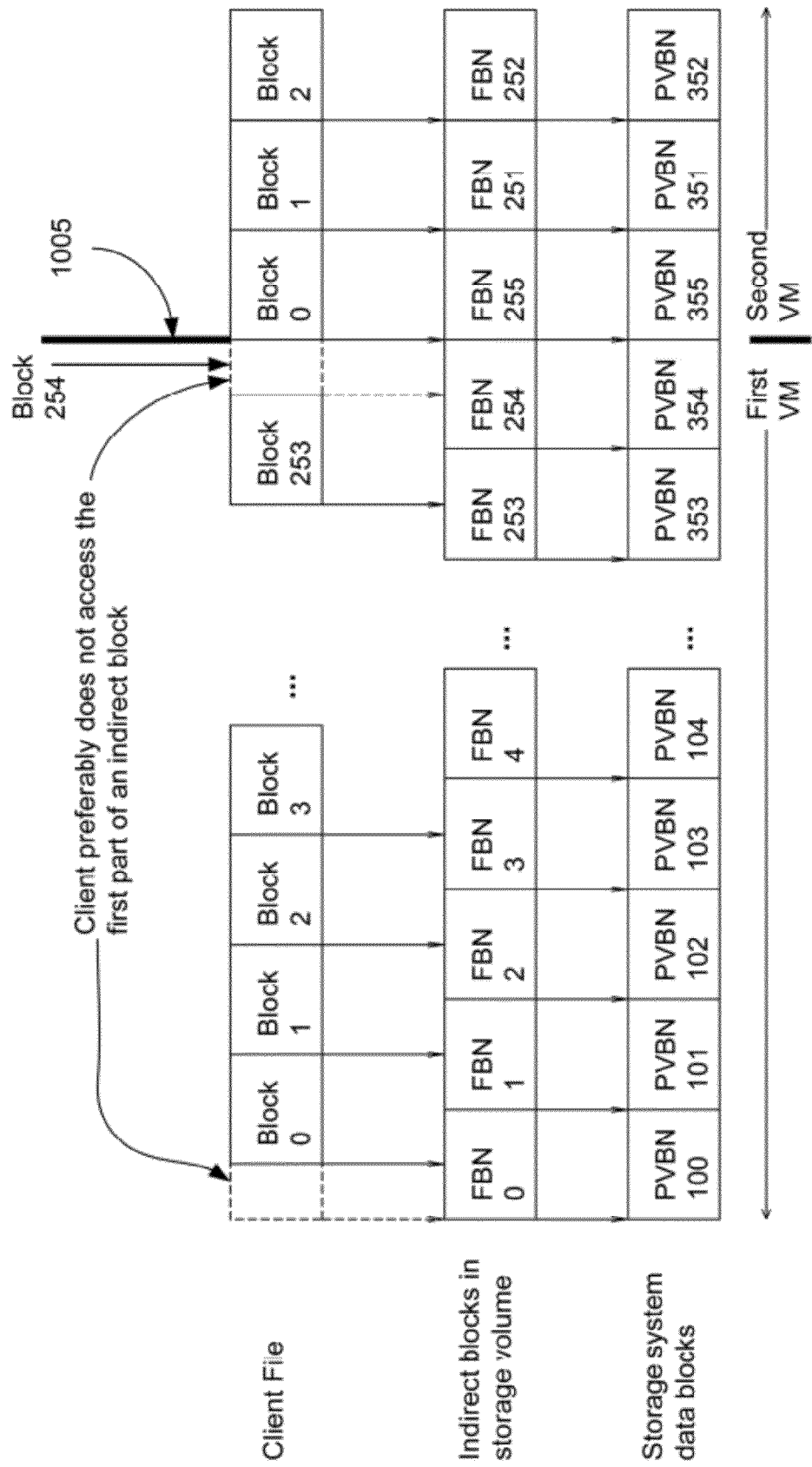
FIG. 10 shows another exemplary client-side and storage server file system including a boundary between an unaligned indirect block and an aligned indirect block.

FIG. 10 shows exemplary two virtual machines (VM's). Both of the VM's include an indirect block. Each of the illustrated indirect blocks has an alignment value of zero, but only the indirect block for the second VM is aligned. The first VM's client-side blocks are not aligned with a corresponding portion of a volume within a storage server while the second VM's client-side blocks are aligned with a corresponding portion of a volume within a storage server. The illustrated client-side file and corresponding storage system data blocks include a boundary 1005 between two indirect blocks, which in this example also corresponds to the boundary 1005 between the two VM's.

For one embodiment, the data blocks in each indirect block are preceded by at least a portion of a block that is preferably not used or accessed by the client to provide spacing between indirect blocks. This spacing region provides room for misalignment and the shifting of blocks due to performing an alignment. For one embodiment, should a client access this spacing region, the I/O request will be directed to data split between the last data block of the one indirect block and the first data block of the next indirect block. For example, in FIG. 10, reading client block 254 results in reading 2KB from the second half of FBN 254 and 2KB from the first half of FBN 255. The impact of an overlapping data block on the border of an indirect block and this spacing region after alignment will be discussed further with respect to FIG. 11.

Figure 11:
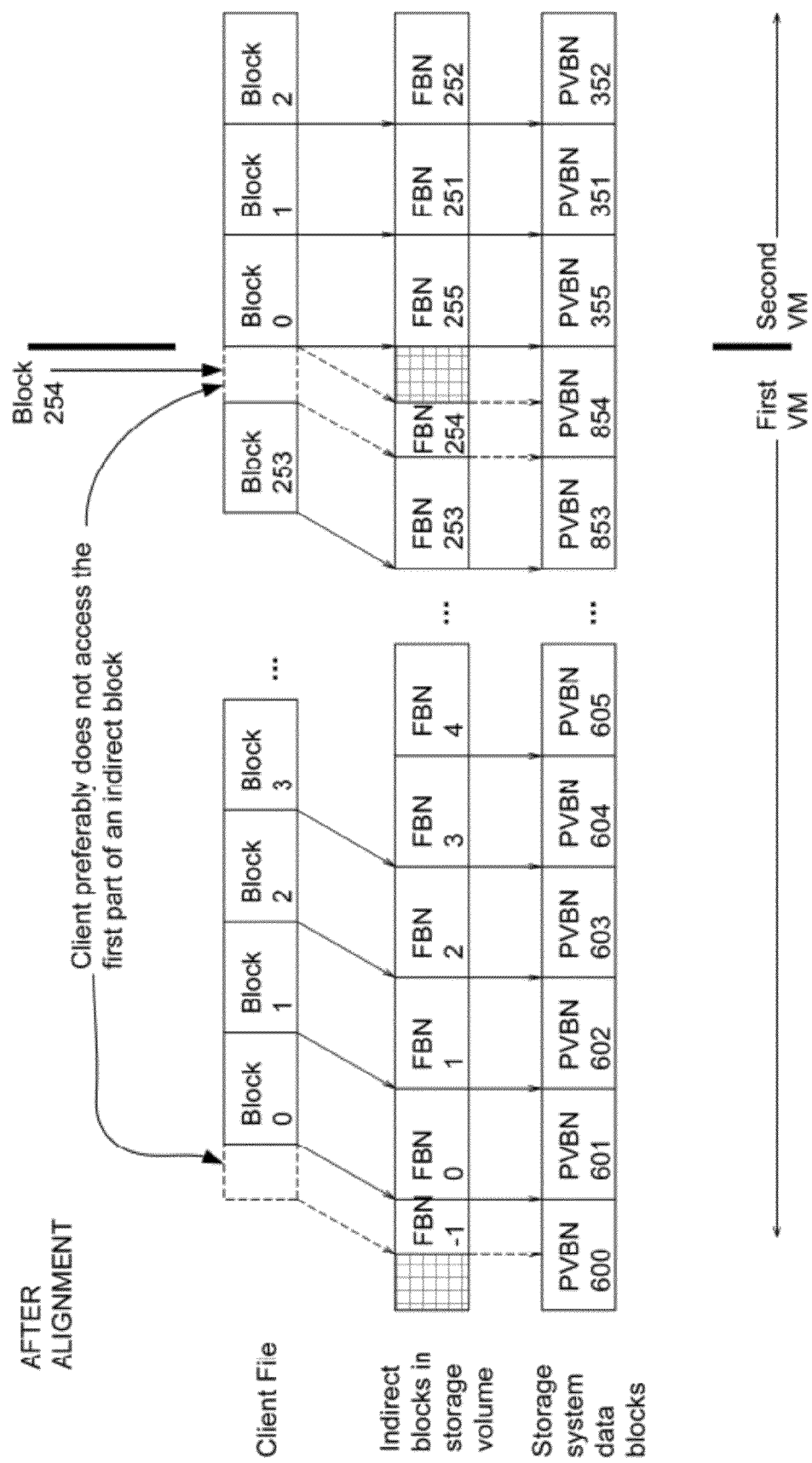
FIG. 11 shows the exemplary client-side file and storage server file system of FIG. 8 after the indirect block has been aligned.

FIG. 11 shows the exemplary two VM's described with reference to FIG. 8 after the indirect block corresponding to the first VM has been aligned and assigned an alignment value (e.g., as described above with reference to FIG. 8). The indirect block corresponding to the first VM has been assigned an alignment value of 4 (e.g., 2 KB). For one embodiment, the alignment is performed by reading the storage system data blocks and rewriting them in an aligned fashion. For one embodiment, the rewriting of the storage system data blocks is to a different set of storage system data blocks. For example, the indirect block illustrated in FIGS. 8 and 9 has been read from physical volume block numbers (PVBN) 100-349 and rewritten to PVBN 600-849.

As described above, for one embodiment, the data blocks in each indirect block are preceded by at least a portion of a block that is preferably not used or accessed by the client. Additionally, the shifting of data blocks resulting from the alignment of the first VM's indirect block creates an additional at least a portion of a block that is preferably not used by the client (illustrated as shaded portions adjacent to FBN-1 and FBN 509). For one embodiment, while nearly all of the data blocks of the first VM's indirect block are now aligned, the last block remains split between the last data block of the first VM's indirect block and the second VM's block because of these unused, shaded block portions. In this scenario, no improvement has been gained for I/O accesses that are directed to the last data block of the newly aligned indirect block (when I/O access to the last data block are permitted). For an alternative embodiment, when the shifting of data blocks after alignment creates an amount of space that is equal to the amount of space consumed by the last data block of the indirect block overlapping into the subsequent indirect block, I/O requests after the alignment are directed to the last data block of the indirect block including the newly created space and no longer require accessing the subsequent indirect block.

Thus, embodiments of detecting and reducing unaligned I/O requests are implemented in a computer system as described herein. In practice, the method 800 may constitute one or more programs made up of computer-executable instructions. The computer-executable instructions may be written in a computer programming language, e.g., software, or may be embodied in firmware logic or in hardware circuitry. The computer-executable instructions to implement a persistent cache may be stored on a machine-readable storage medium. A "computer-readable storage medium," or a "non-transitory computer-readable storage medium," as the terms are used herein, include any mechanism that provides (i.e., stores and/or transmits) information in a form accessible by a machine (e.g., a computer, network device, personal digital assistant (PDA), manufacturing tool, any device with a set of one or more processors, etc.). A "non-transitory computer-readable storage medium," as the term is used herein, does not include a signal, carrier wave, etc. The term RAM as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into RAM/memory during execution of software by a processor. One of skill in the art will immediately recognize that the terms "machine-readable storage medium" and "computer-readable storage medium" include any type of volatile or non-volatile storage device that is accessible by a processor. For example, a machine-readable storage medium includes recordable/non-recordable media (e.g., read-only memory (ROM); random access memory (RAM); magnetic disk storage media; optical storage media; flash memory devices; etc.).

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Therefore, it is manifestly intended that this invention be limited only by the following claims and equivalents thereof.

What is claimed is:

1. A computerized method comprising:
    determining, by a storage server, an alignment value to be used for a plurality of data blocks stored by the storage server that are identified by an indirect block, wherein the alignment value represents a difference between a start of a data block according to a first client and a start of the data block according to the storage server, wherein the plurality of data blocks are stored within a first portion of a volume of a storage system and wherein the storage server also stores data blocks for a second client within a second portion of the volume, and wherein the indirect block includes a plurality of locations of the plurality of data blocks;
    writing, by the storage server, the alignment value to a set of one or more bits within the indirect block;
    reading, by the storage server, all of the plurality of data blocks identified by the indirect block;
    writing, by the storage server, all of the plurality of data blocks identified by the indirect block to new locations based upon the alignment value; and
    responsive to receiving an input/output (I/O) request for one data block of the plurality of data blocks identified by the indirect block,
        reading the indirect block to identify a location of the one data block and the alignment value,
        applying the identified alignment value to the identified location of the one data block to create a realigned location of the one data block, and
        accessing the one data block using the realigned location of the one data block.

2. The computerized method of claim 1, wherein said applying of the identified alignment value to the identified location of the one data block comprises adding or subtracting a multiple of the alignment value to the location of the one data block.

3. The computerized method of claim 1, wherein the volume is a logical unit identified by a logical unit number (LUN).

4. The computerized method of claim 1, wherein the alignment value is determined by:
    maintaining a series of counters for a series of possible values for the alignment value;
    incrementing one of the counters for each I/O request directed to the first portion of the volume; and
    determining, upon reaching a threshold, the alignment value corresponding to a counter with a highest value.

5. The computerized method of claim 4, wherein the threshold is reached when a counter reaches an upper limit.

6. The computerized method of claim 4, wherein the threshold is reached when a number of I/O requests directed to the portion of the volume reaches an upper limit.

7. The computerized method of claim 4, wherein the threshold includes an amount of time that has passed from a previous determination of the alignment value.

8. The computerized method of claim 1, wherein the first client is a first virtual machine and the second client is a second virtual machine.

9. The computerized method of claim 1, wherein the difference between the start of the data block according to the first client and the start of the data block according to the storage server results from an inclusion of a boot record within the volume for the first client.

10. A storage server comprising:
    a memory;
    a processor coupled to the memory through a bus, wherein the processor executes instructions that cause the processor to,
        determine an alignment value to be used for a plurality of data blocks stored by the storage server that are identified by an indirect block, wherein the alignment value represents a difference between a start of a data block according to a first client and a start of a data block according to the storage server, wherein the plurality of data blocks are stored within a first portion of a volume of a storage system and wherein the storage server also stores data blocks for a second client within a second portion of the volume, and wherein the indirect block includes a plurality of locations of the plurality of data blocks,
        write the alignment value to a set of one or more bits within the indirect block,
        read all of the plurality of data blocks identified by the indirect block,
        write all of the plurality of data blocks identified by the indirect block to new locations based upon the alignment value,
        responsive to a receipt of an input/output (I/O) request for one data block of the plurality of data blocks identified by the indirect block,
            read the indirect block to identify a location of the one data block and the alignment value,
            apply the identified alignment value to the identified location of the one data block to create a realigned location of the one data block, and
            access the one data block using the realigned location.

11. The storage server of claim 10, wherein the processor is to apply the identified alignment value to the identified location of the one data block by adding or subtracting a multiple of the alignment value to the location of the one data block.

12. The storage server of claim 10, wherein the volume is a logical unit identified by a logical unit number (LUN).

13. The storage server of claim 10, wherein the alignment value is determined by:
    maintaining a series of counters for a series of possible values for the alignment value;
    incrementing one of the counters for each I/O request directed to the first portion of the volume; and
    determining, upon reaching a threshold, the alignment value corresponding to a counter with a highest value.

14. The storage server of claim 13, wherein the threshold is reached when a counter reaches an upper limit.

15. The storage server of claim 13, wherein the threshold is reached when a number of I/O requests directed to the portion of the volume reaches an upper limit.

16. The storage server of claim 13, wherein the threshold includes an amount of time that has passed from a previous determination of the alignment value.

17. The storage server of claim 10, wherein the first client is a first virtual machine and the second client is a second virtual machine.

18. The storage server of claim 10, wherein the difference between the start of the data block according to the first client and the start of the data block according to the storage server results from an inclusion of a boot record within the volume for the first client.

19. A computerized method, comprising:
receiving, by a storage server, a request from a first virtual machine for data stored within a logical unit identified by a logical unit number (LUN);
determining, by the storage server, a first indirect block of the logical unit that identifies the requested data, wherein the storage server also identifies data for a second virtual machine within a second indirect block of the logical unit;
computing, by the storage server, an alignment value for the requested data, wherein the alignment value represents a difference between a start of a data block storing the requested data according to the first virtual machine and a start of the data block storing the requested data according to the storage server; and
responsive to determining that a threshold has been reached for the computed alignment value,
  reading, by the storage server, all data blocks identified by the first indirect block of the logical unit,
  writing, by the storage server, the alignment value to a set of one or more bits within the first indirect block, wherein the first indirect block has a different alignment value from the second indirect block,
  writing, by the storage server, all of the data blocks identified by the first indirect block to a new location based upon the alignment value, and
  fulfilling the request by looking up the requested data using a realigned location that is based upon applying the alignment value from the first indirect block to a location of a first data block, wherein the location of the first data block is stored within the first indirect block.

20. The computerized method of claim 19, wherein the determination that the threshold has been reached includes:
maintaining a series of counters for a series of possible values for the alignment value;
incrementing one of the counters for each request directed to the first indirect block; and
comparing the counter for the alignment value with a threshold value.

* * * * *